(12) United States Patent
Chung

(10) Patent No.: US 8,347,133 B2
(45) Date of Patent: Jan. 1, 2013

(54) METHOD FOR ADJUSTING COMPUTER SYSTEM AND MEMORY

(75) Inventor: Kun-Shan Chung, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 434 days.

(21) Appl. No.: 12/768,746

(22) Filed: Apr. 28, 2010

(65) Prior Publication Data

US 2010/0281291 A1    Nov. 4, 2010

(30) Foreign Application Priority Data

Apr. 30, 2009  (TW) ............................... 98114412 A

(51) Int. Cl.
*G06F 1/00*  (2006.01)
*G06F 1/12*  (2006.01)
*G06F 5/06*  (2006.01)

(52) U.S. Cl. ......... 713/322; 713/400; 713/600; 716/134

(58) Field of Classification Search ................... 713/322, 713/400, 600; 716/134
See application file for complete search history.

(56) References Cited

U.S. PATENT DOCUMENTS

| 6,570,428 | B1 | 5/2003 | Liao et al. | |
| 6,760,856 | B1 * | 7/2004 | Borkenhagen et al. | 713/401 |
| 2002/0087768 | A1 * | 7/2002 | Srikanth et al. | 710/118 |
| 2002/0169922 | A1 * | 11/2002 | Thomann et al. | 711/100 |
| 2008/0033678 | A1 * | 2/2008 | Bachhuber et al. | 702/89 |
| 2008/0052658 | A1 * | 2/2008 | Rudrud | 716/12 |
| 2009/0265575 | A1 * | 10/2009 | Chen | 713/600 |
| 2010/0271094 | A1 * | 10/2010 | Hassan | 327/161 |

FOREIGN PATENT DOCUMENTS

| CN | 1983446 | 6/2007 |
| TW | 463080 | 11/2001 |

* cited by examiner

*Primary Examiner* — Vincent Tran
(74) *Attorney, Agent, or Firm* — Jianq Chyun IP Office

(57) ABSTRACT

The invention provides an adjusting method of a system for changing a working frequency in an operation system for a computer system. The adjusting method includes establishing a look-up table, and detecting a newest value of the working frequency. An adjustment value can be obtained from the look-up table according to the newest value of the working frequency. In addition, a phase difference of a control signal of a memory is adjusted in the computer system according to the adjustment value and the working frequency is executed stably in optimum status according to the present invention.

17 Claims, 5 Drawing Sheets

METHOD FOR ADJUSTING COMPUTER SYSTEM AND MEMORY

CROSS-REFERENCE TO RELATED APPLICATION

This application claims the priority benefit of Taiwan application serial no. 98114412, filed on Apr. 30, 2009. The entirety of the above-mentioned patent application is hereby incorporated by reference herein and made a part of specification.

BACKGROUND OF THE INVENTION

1. Field of the Invention

The invention is related to an adjusting method of a computer system and memory, more particularly, to the adjusting method for changing a working frequency according to a phase difference of a control signal of the memory, and the computer system and the memory still execute stably while loading an operation system.

2. Description of the Related Art

With the requirements of multi-media development and the computer system revolution improves, the memory with higher speed, preferred function and lower power consumption is needed. Some kinds of memory technologies, such as Rambus DRAM, DDR SDRAM, and standard SDRAM for PC133 are competitiveness in the market. High speed memory such as DDR can be manufactured by conventional apparatuses, and will be the next generation of DRAM standard. For DDR, the speed of transmitting data is doubled to increase the speed of execution.

FIG. 1A is a time-domain diagram of Data Queue Strobe (DQS) signal of DDR in a normal status. Referred to FIG. 1A, in the normal status, the cross point of the DQS signal 102 and the reference voltage signal 104 is about the time point of the positive peak value A or the negative peak value B of the data timing signal 106. In other words, when the voltage differential value of the data timing signal 106 meets a maximum absolute value, the DQS signal 102 crosses with the reference voltage signal 104 for the memory executing stably.

FIG. 1B is a time-domain diagram of DQS signal in an overclock rate status. Referred to FIG. 1B, when a computer executes in either a higher clock rate or a lower clock rate compared with a normal status, the curves of the DQS signal 102 and the data timing signal 106 become deformed, not as the smooth curves that shown in FIG. 1A. At the moment, the cross point of the DQS signal 102 and the reference voltage signal 104 will not possible equal to the time point that meets a maximum absolute value of the voltage differential value of the data timing signal 106. As a result, the memory cannot work stably.

BRIEF SUMMARY OF THE INVENTION

The invention provides a computer system, an adjusting method of the computer system, a control method of a memory for the computer system and an application program of the computer system. According to the disclosure of the present invention, the computer system, the memory and the application program can execute stably even the working frequency changes while loading an operation system.

The invention provides a computer system with a working frequency, the computer system includes a processor, a memory, and an application system. The memory couples with the processor and provides a control signal, a reference voltage signal and a data timing signal. The control signal is generated according to a value of a memory control register. In addition, the application system couples with the processor and is provided under an operation system of the computer system. When the working frequency of the computer system changes while loading an operation system, the application system obtains an adjustment value from a look-up table according to the newest value of the working frequency. The adjustment value is stored in the memory control register by the application system to adjust a phase difference of the control signal.

The invention also provides an adjusting method of a system for changing a working frequency in an operation system for a computer system. The adjusting method includes establishing a look-up table, and detecting a newest value of the working frequency. Then, an adjustment value is obtained from the look-up table according to the newest value of the working frequency. In addition, a phase difference of a control signal of a memory is adjusted in the computer system according to the adjustment value in the present invention.

The invention further provides a control method of a memory for a computer system. The control method includes providing a memory control register to generate a control signal in the memory of the computer system according to a value of the memory control register. When a working frequency in an operation system of the computer system is changed, an adjustment value is obtained from a look-up table according to the newest value of the working frequency. The adjustment value is stored in the memory control register to adjust a phase difference of the control signal.

In addition, the invention also provides an application program. When the working frequency of the computer system changes while loading an operation system, the newest value of the working frequency is adjusted. An adjustment value can be obtained from a look-up table and store the adjustment value in the memory control register to adjust a phase difference of the control signal of the memory in the present invention, and the working frequency executes stably in optimum status.

In some embodiments of the invention, the control signal can be a DQS signal.

After the adjustment value is stored in the memory control register, and when a voltage differential value of the data timing signal meets a maximum absolute value, the DQS signal crosses with the reference voltage signal according to the adjustment value of the memory control register in the present invention.

The phase difference of the DQS signal can be adjusted dynamically according to the present invention, so when adjusting the working frequency of the computer system, the computer system can still work stably.

These and other features, aspects and advantages of the present invention will become better understood with regard to the following description, appended claims, and accompanying drawings.

DETAILED DESCRIPTION OF THE EMBODIMENTS

Figure 1A:
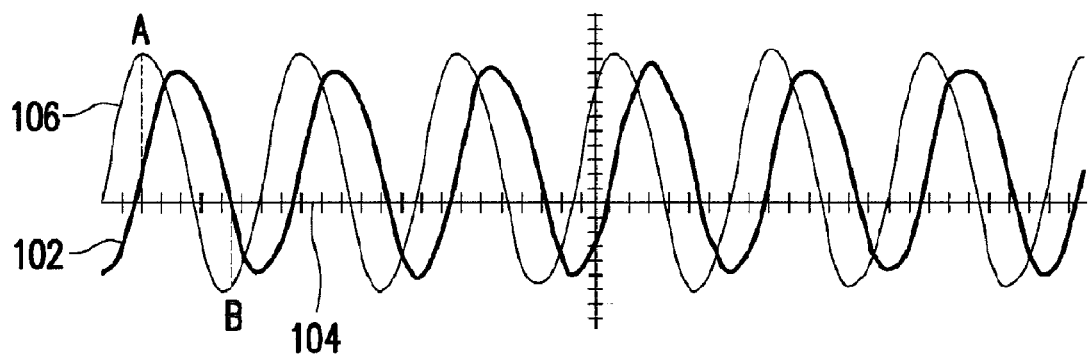
FIG. 1A is a time-domain diagram of DQS signal of DDR in a normal status.
Figure 1B:
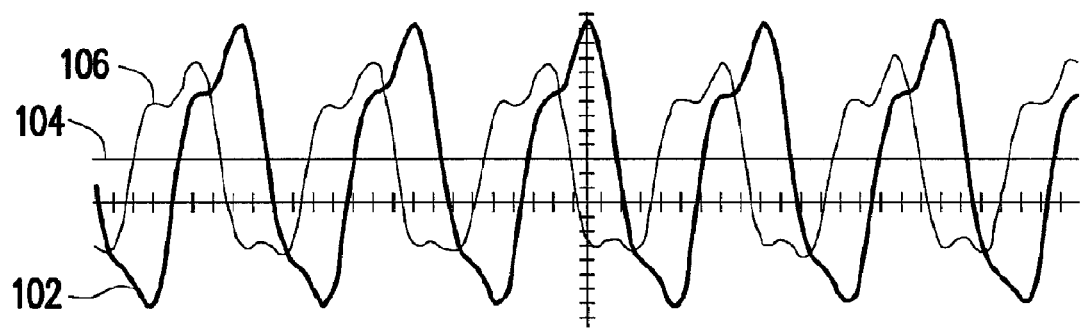
FIG. 1B is a time-domain diagram of DQS signal in a higher rate status compared with a normal status.
Figure 2:
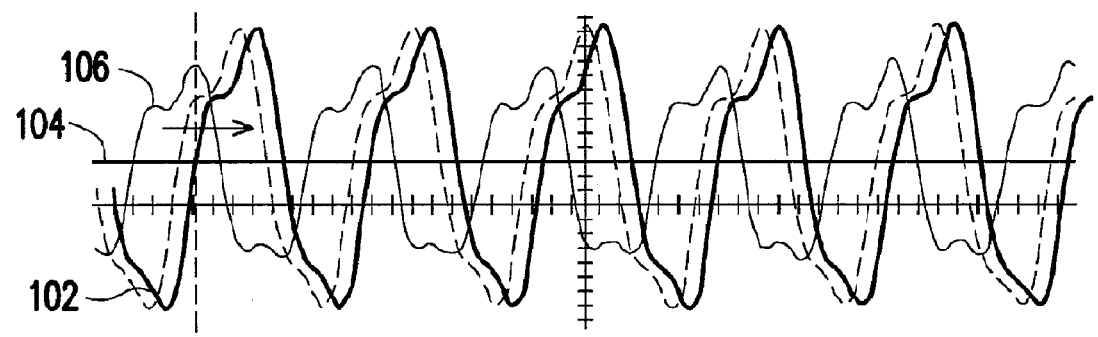
FIG. 2 is a time-domain diagram of DQR of DDR in a higher rate status compared with a normal status of a preferred embodiment in the invention.

As shown in FIG. 1B, when a computer system executes in a higher clock rate compared with a normal status, a control signal 102, such as a Data Queue Strobe (DQS) signal of the memory is deformed and the cross point of the control signal 102 and the reference voltage signal 104 is not equal to the time point when a voltage differential value of the data timing signal 106 that meets a maximum absolute value. As a result, as shown in FIG. 2, in the present invention, when adjusting a working frequency of CPU in the computer system, a phase difference of the control signal 102 is adjusted synchronously, and the cross point of the control signal 102 and the reference voltage signal 104 is equal to the time point when the voltage differential value of the data timing signal 106 in a maximum absolute value. Therefore, when adjusting the working frequency of CPU in the computer system, the CPU still executes stably.

Figure 3:
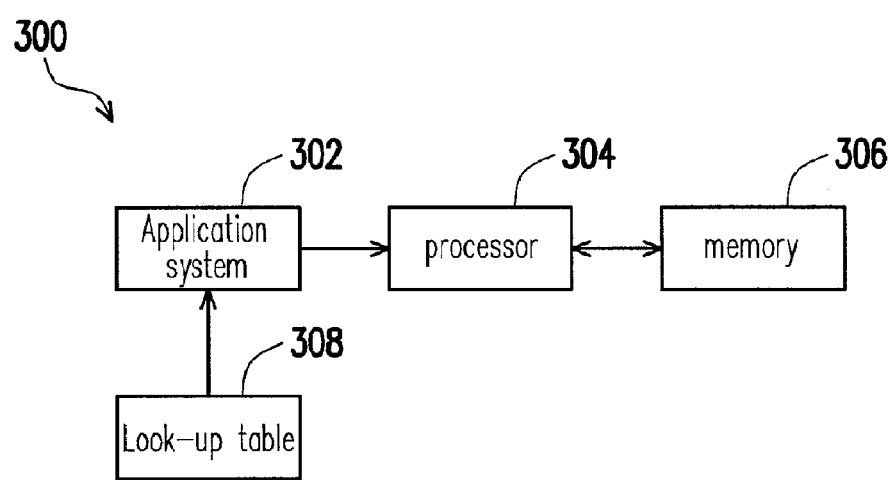
FIG. 3 is a block diagram of a computer system of a preferred embodiment in the invention.

FIG. 3 is a block diagram of a computer system of a preferred embodiment in the present invention. As shown in FIG. 3, the computer system 300 can be a desktop computer, a portable computer or other computers.

The computer system 300 includes an application system 302, a processor 304 and a memory 306. The application system 302 can be executed by an application program, and can be provided in an outside storage medium, an operation system of the computer system or BIOS. When the working frequency of the CPU in the computer system 300 is adjusted (to a higher rate status or lower rate status), the phase of the control signal of the memory 306 is adjusted according to the working frequency of the CPU 402 by the application system 302.

In the present embodiment, the application system 302 couples with the processor 304, and the processor 304 couples with the memory 306. The memory 306 is preferably a Random Access Memory (RAM). In addition, a look-up table 308 established by users is provided in the computer system 300, and the function of the look-up table 308 is described as following description.

Referred to FIG. 3 again, the memory 306 provides a reference voltage signal, a data timing signal and at least a control signal. In the embodiment, the control signal can be a Data Queue Strobe (DQS) signal, a Data Queue (DQ) signal, a memory timing signal and etc. . . . .

Figure 4:
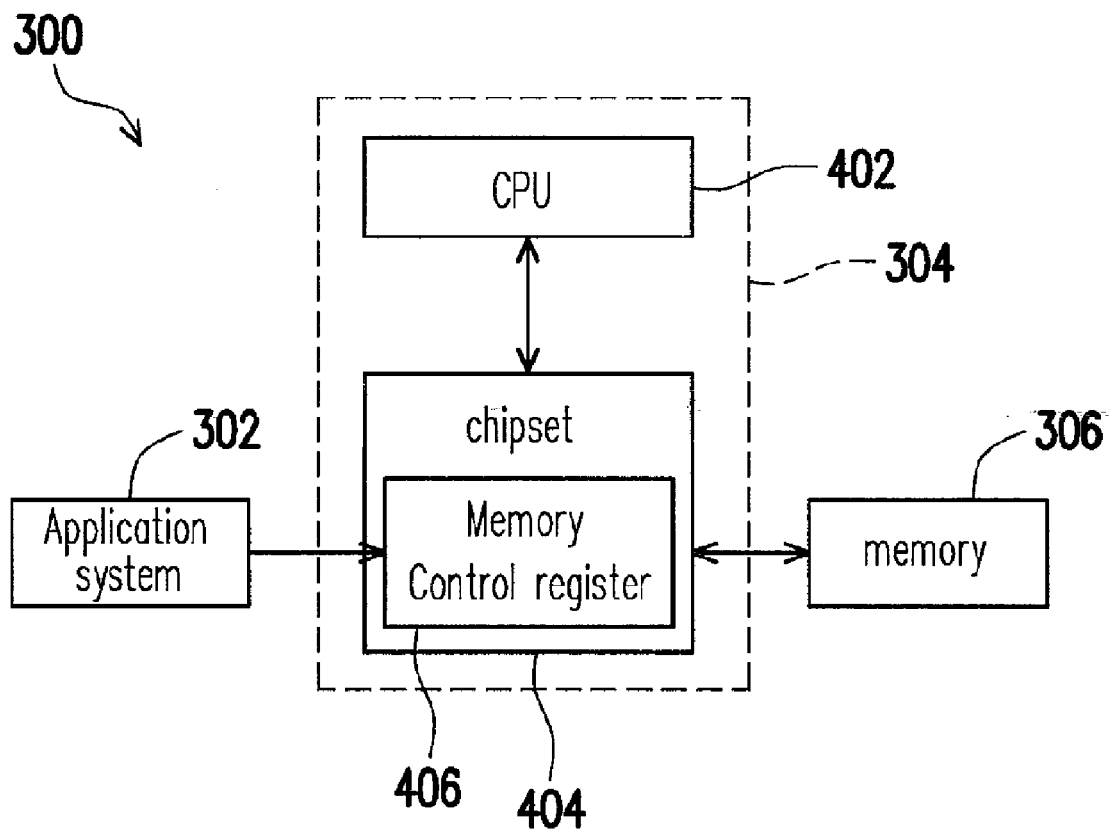
FIG. 4 is a block diagram of a processor of a preferred embodiment in the invention.

FIG. 4 is a block diagram of a processor of a preferred embodiment in the present invention. As shown in FIG. 4, the processor 304 includes a central processing unit (CPU) 402 and a chipset 404. The CPU 402 couples with the chipset 404, and the chipset 404 couples with the memory 306. In the other embodiment, the CPU 402 can directly couple with the memory 306. In addition, the chipset 404 includes at least a memory control register 406 in the present application. The control signal of the memory 306 is generated according to the value of the memory control register 406.

While the computer system 300 is loaded with an operation system, and the application system 302 is acted, and the changes of the working frequency of CPU 402 of the computer system 300 are detected by the application system 302. When the working frequency is changed, the application system 302 detects a newest value of the working frequency of the CPU 402 and obtains an adjustment value from the look-up table 308 according to the newest value of the working frequency.

After the adjustment value is obtained, the adjustment value is filled in the memory control register 406 of the chipset 404 by the application system 302. Therefore, the phase of the control signal of the memory 306 can be adjusted according to the adjustment value of the memory control register 406.

The following description takes the DQS signal for example to describe the above procedures.

Figure 5:
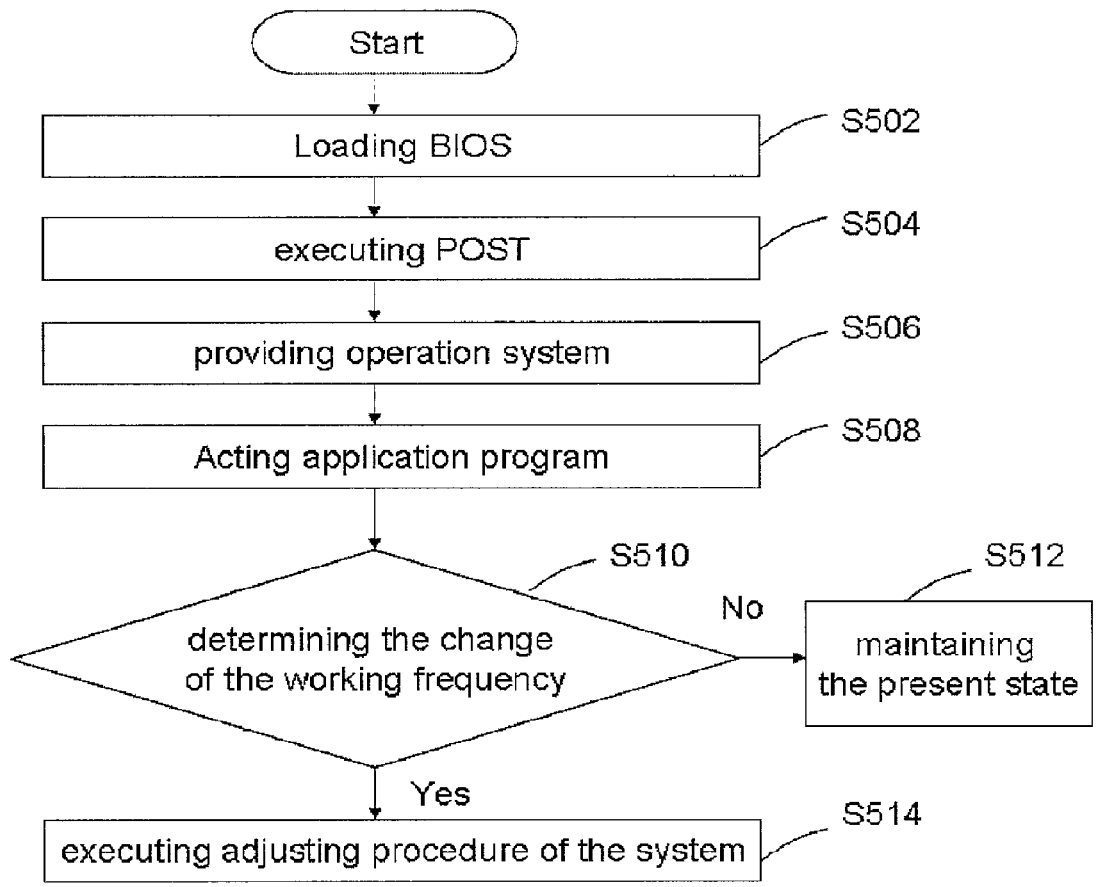
FIG. 5 is a flow chart of a system executed of a computer system of an embodiment in the invention.

FIG. 5 is a flow chart of a system executed of a computer system of an embodiment in the invention. Referred to FIG. 5, when the computer system is booted, the BIOS executes, as shown in step S502 and the Power On Self Test (POST) executes, as shown in step S504. After the BIOS and the POST is completed, the operation system is provided, as shown in step S506. In the embodiment, the application program can be included in the operation system, so after the operation system is completely loaded, the application program is acted, as shown in step S508.

After the application program is acted, as shown in step S510, whether the change of the working frequency of the computer system is determined. If the working frequency of the computer system doesn't change (as "No" shown in step S510), the present state of the computer system is maintained, as shown in step S512. On the contrary, if the working frequency of the computer system changes, the adjusting procedure of the system is executed, as shown in step S514.

Figure 6:
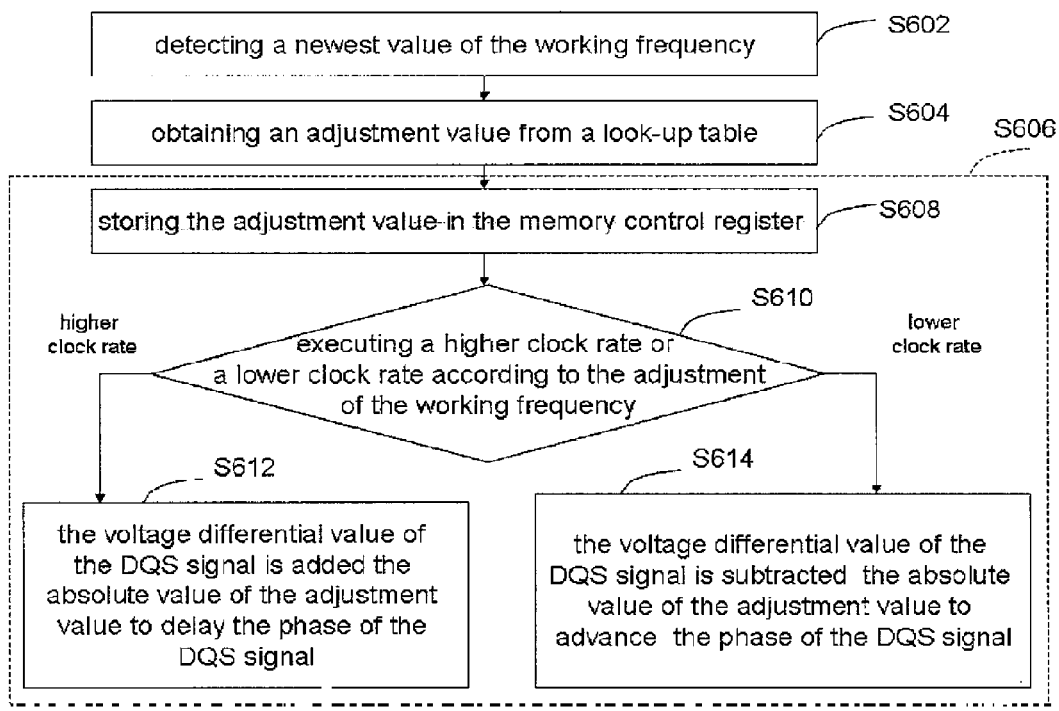
FIG. 6 is a flow chart of an adjusting procedure of the system of a preferred embodiment in the invention.

FIG. 6 is a flow chart of an adjusting procedure of the system of a preferred embodiment in the invention. Referred to FIG. 6, when the adjusting procedure of the system is acted, as shown in step S602, a newest value of the working frequency is detected. Therefore, an adjustment value is obtained from a look-up table according to the newest value of the working frequency, as shown in step S604. Then, a control procedure of the memory can be executed, as shown in step S606.

In step S606, the adjustment value is stored in the memory control register like step S608. Then, as shown in step S610, different procedures can be executed according to the adjustment for a higher clock rate or a lower clock rate compared with a normal status of the working frequency.

If the working frequency is adjusted to a higher clock rate compared with a normal status, as shown in FIG. 2 and step S612, the phase difference of the DQS signal 102 is added to the absolute value of the adjustment value to delay the phase of the DQS signal 102. Therefore, the rising direction of the DQS signal 102 is clockwise skewed and when the voltage differential value of the data timing signal 106 meets a maximum absolute value, the DQS signal 102 crosses with the reference voltage signal 104 and the memory works stably.

Similarly, if the working frequency is adjusted to execute a lower clock rate compared with a normal status, as shown in FIG. 1B, the data timing signal 106 may be pulled to lower potential. At this time, the phase difference of the DQS signal is subtracted the absolute value of the adjustment value to advance the phase of the DQS signal 102, as shown in step S614. In other words, the rise of the DQS signal 102 is anti-clockwise skewed and when the voltage differential value of the data timing signal 106 meets a maximum absolute value, the DQS signal 102 crosses with the reference voltage signal 104, and the memory can also work stably.

To sum up, when the working frequency of the computer system changes while loading an operation system, an adjustment value is obtained from the look-up table according to the newest value of the working frequency. The phase difference of the memory is adjusted according to the adjustment value. When a voltage differential value of the data timing signal meets a maximum absolute value, the control signal crosses with the reference voltage signal and the memory works stably. Therefore, the computer system is maintained to work stably.

Although the present invention has been described in considerable detail with reference to certain preferred embodiments thereof, the disclosure is not for limiting the scope of the invention. Persons having ordinary skill in the art may make various modifications and changes without departing from the scope of the invention. Therefore, the scope of the appended claims should not be limited to the description of the preferred embodiments described above.

What is claimed is:

1. A computer system with a working frequency, comprising:
    a processor having a memory control register;
    a memory coupled with the processor and providing a control signal, a reference voltage signal and a data timing signal, and the control signal is generated according to a value of the memory control register; and
    an application system coupled with the processor and provided under an operation system of the computer system, when the working frequency is changed while the operation system is loaded in the computer system, the application system obtaining an adjustment value from a look-up table according to the newest value of the working frequency, and the adjustment value is stored in the memory control register to adjust a phase difference of the control signal.

2. The computer system according to claim 1, wherein the control signal is a Data Queue Strobe (DQS) signal.

3. The computer system according to claim 2, wherein after the adjustment value is stored in the memory control register, and when a voltage differential value of the data timing signal meets a maximum absolute value, the DQS signal crosses with the reference voltage signal according to the adjustment value.

4. The computer system according to claim 2, wherein the processor comprising;
    a central processing unit (CPU); and
    a chipset coupling with the CPU and having the memory control register, the chipset outputs the control signal to the memory according to the value of the memory control register.

5. The computer system according to claim 4, wherein the memory couples with the CPU or the chipset.

6. An adjusting method of a system for changing a working frequency in an operation system of a computer system, comprising the following steps:
    establishing a look-up table;
    detecting a newest value of the working frequency;
    obtaining an adjustment value from the look-up table according to the newest value of the working frequency; and
    adjusting a phase difference of a control signal of a memory in the computer system according to the adjustment value.

7. The adjusting method according to claim 6, wherein the control signal is a DQS signal.

8. The adjusting method according to claim 7, wherein the memory further provides a reference voltage signal and a data timing signal, according to the adjustment value, the DQS signal crosses with the reference voltage signal when a voltage differential value of the data timing signal meets a maximum absolute value in the step of adjusting the phase difference of the control signal.

9. The adjusting method according to claim 6, wherein the computer system is a desktop computer.

10. The adjusting method according to claim 6, wherein the computer system is a portable computer.

11. A control method of a memory for a computer system, comprising the following steps:
    providing a memory control register to generate a control signal in the memory of the computer system according to a value of the memory control register;
    when a working frequency in an operation system of the computer system is changed, an adjustment value is obtained from a look-up table according to the newest value of the working frequency; and
    storing the adjustment value in the memory control register to adjust a phase difference of the control signal.

12. The control method according to claim 11, wherein the control signal is a DQS signal.

13. The control method according to claim 12, further comprising the step of:
    providing a reference voltage signal and a data timing signal to the memory.

14. The control method according to claim 13, further comprising:
    when the working frequency in the operation system of the computer system is at a higher clock rate compared with a normal status, the phase difference of the DQS signal is added to the absolute value of the adjustment value to delay the phase of the DQS signal; and the DQS signal crosses with the reference voltage signal when the voltage differential value of the data timing signal meets a maximum absolute value.

15. The control method according to claim 13, further comprising:
    when the working frequency in the operation system of the computer system is at a lower clock rate compared with a normal status, the phase difference of the DQS signal is subtracted the absolute value of the adjustment value to advance the phase of the DQS signal, and the DQS signal crosses with the reference voltage signal when the voltage differential value of the data timing signal meets a maximum absolute value.

16. The control method according to claim 11, wherein the computer system is a desktop computer.

17. The control method according to claim 11, wherein the computer system is a portable computer.

* * * * *